(12) United States Patent
Schmitt

(10) Patent No.: US 8,245,670 B2
(45) Date of Patent: Aug. 21, 2012

(54) HIGH TEMPERATURE ADJUSTABLE SENSOR HOUSING SYSTEM APPARATUS

(76) Inventor: David W. Schmitt, Tulsa, OK (US)

( * ) Notice: Subject to any disclaimer, the term of this patent is extended or adjusted under 35 U.S.C. 154(b) by 1102 days.

(21) Appl. No.: 12/047,905

(22) Filed: Mar. 13, 2008

(65) Prior Publication Data

US 2009/0229811 A1    Sep. 17, 2009

(51) Int. Cl.
 *F22B 37/42* (2006.01)
(52) U.S. Cl. .................. 122/504; 348/373
(58) Field of Classification Search .......... 122/504; 348/373; 432/231, 233
 See application file for complete search history.

(56) References Cited

U.S. PATENT DOCUMENTS

| | | | |
|---|---|---|---|
| 3,075,113 A * | 1/1963 | Soar | 313/17 |
| 3,075,133 A | 1/1963 | Soar | |
| 3,521,213 A | 7/1970 | Hardy | |
| 4,123,707 A * | 10/1978 | Fujii et al. | 324/207.16 |
| 4,432,286 A | 2/1984 | Witte | |
| 4,965,601 A * | 10/1990 | Canty | 396/19 |
| 5,162,906 A * | 11/1992 | Yorita et al. | 348/83 |
| 5,394,208 A | 2/1995 | Campbell | |
| 5,472,337 A | 12/1995 | Guerra | |
| 5,864,365 A | 1/1999 | Sramek et al. | |
| 6,060,719 A | 5/2000 | Ditucci et al. | |
| 6,239,831 B1 * | 5/2001 | Eversole et al. | 348/83 |
| 6,278,374 B1 | 8/2001 | Ganeshan | |
| 6,329,921 B1 | 12/2001 | Tindall et al. | |
| 6,778,209 B1 * | 8/2004 | Eversole et al. | 348/83 |
| 7,583,314 B2 * | 9/2009 | Kajihara et al. | 348/373 |
| 7,762,731 B2 * | 7/2010 | Arbuckle et al. | 396/427 |

OTHER PUBLICATIONS

G. Lu, G. Gilabert and Y. Yan, Vision Based Monitioring and Characterisation of Combustion Flames, Journal of Physics: Conference Series 15, (2005) 194-200.
Gas Technology Institute, Real Time Flame Monitoring of Gasifier Burner and Injectors, Oct. 2003, GTI Project No. 61162.
International Search Report and Written Opinion issued by the International Searching Authority (ISA/US) on May 12, 2009 in corresponding PCT/US09/36944 (10 pgs).
International Report on Patentability issued by the International Bureau on Sep. 23, 2010 in PCT/US2009/036944 (7 pgs).

* cited by examiner

*Primary Examiner* — Gregory A Wilson
(74) *Attorney, Agent, or Firm* — Gable Gotwals

(57) ABSTRACT

A sensor housing system maintains a sensor—which is used in monitoring an extreme temperature environment such as a combustion unit—at a desired ambient temperature. The system comprises one or more sensors housed within an internal chamber and cooled by air or an inert gas. Gas within the chamber cools the sensor and then exhausts to a second internal chamber which, in turn, exhausts to atmosphere. Both chambers are housed in a directional ball pivot that provides access to the extreme temperature environment and adjusts the angle of the sensor. An air tube having a sweep is directed toward the external surface of the glass wafer and directs a hot gas stream across the surface of the wafer. A failsafe device retracts the chambers from the extreme temperature environment in case of power failure or if for some reason the sensor becomes too hot.

19 Claims, 3 Drawing Sheets

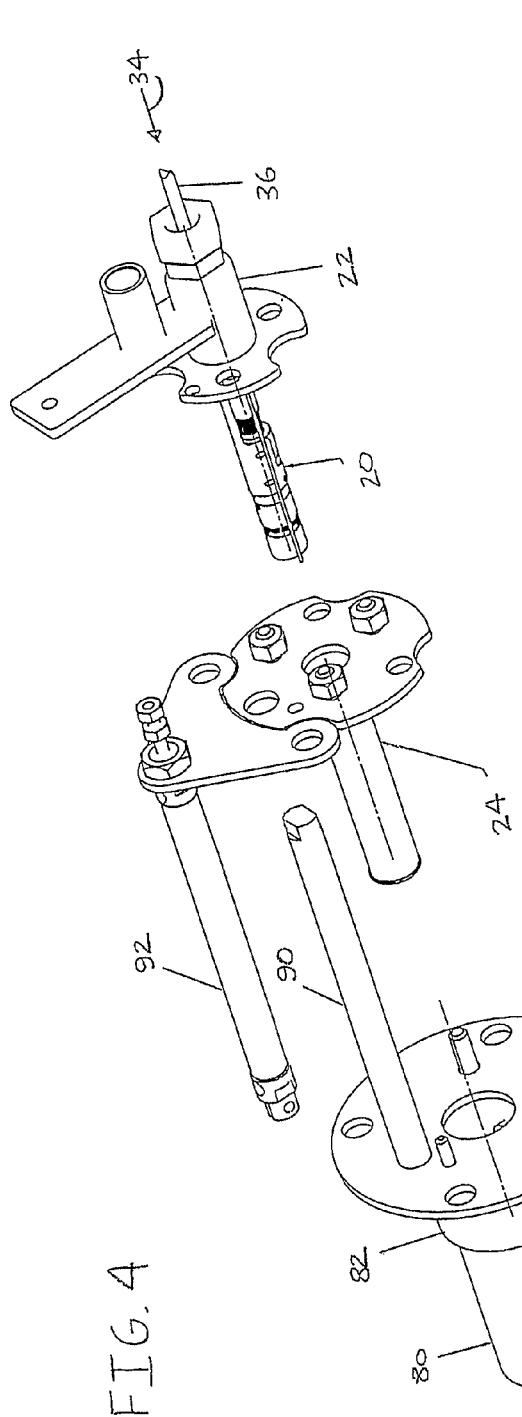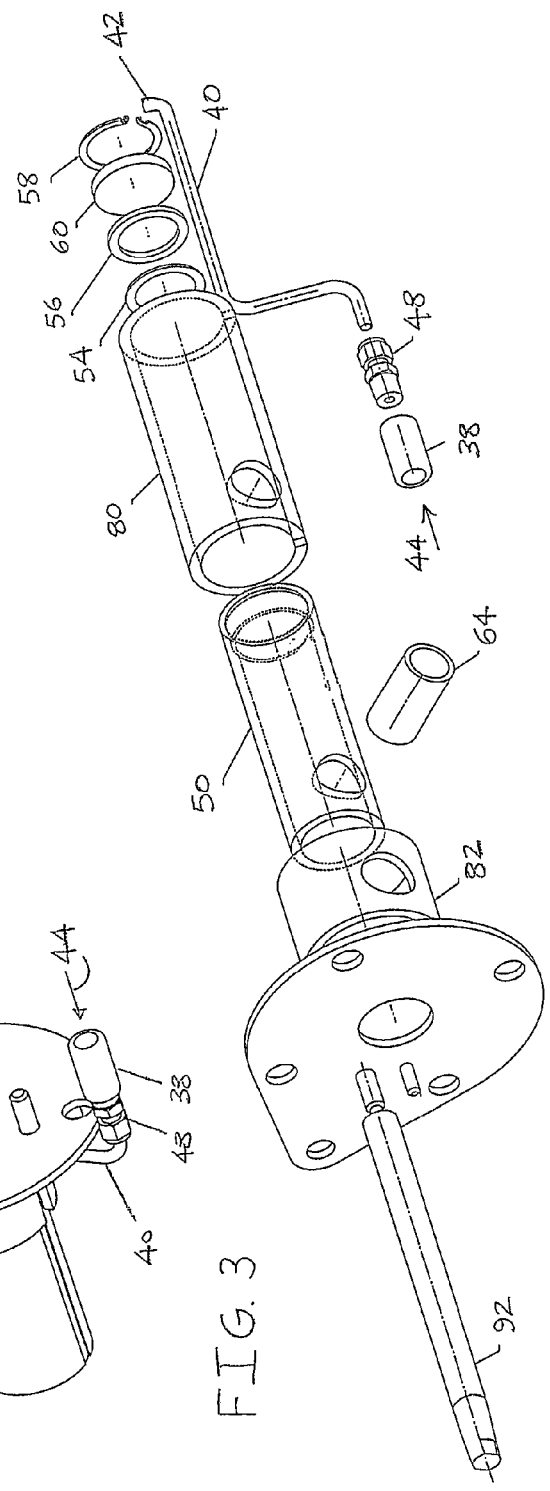

HIGH TEMPERATURE ADJUSTABLE SENSOR HOUSING SYSTEM APPARATUS

REFERENCE TO PENDING APPLICATIONS

This application is not based upon any pending domestic or international patent application.

FIELD OF INVENTION

The present invention relates to flame detector apparatuses and flame management systems. More specifically, the present invention relates to controlling the operating environment of detection devices used for monitoring burner flames and pilot flames in a combustion unit.

BACKGROUND OF THE INVENTION

Boilers, driers, furnaces, gasifiers, incinerators, ovens, and other combustion units used in industrial processes require monitoring of one or more burner or pilot flames for safety and quality control purposes. Each combustion unit typically employs a control system with one or more flame detection devices coupled to a flame sensing circuitry. These flame detection devices allow furnace operators to shut down fuel and air supply in the event of a flame failure and to adjust burner controls to change flame characteristics such as flame length and firing rate.

Common flame detection devices include flame rods—which use flame conductivity as a detection means—photosensitive conductors, which use compounds that are electrically sensitive to the flame, and photoelectric detectors that respond to infrared and ultraviolet radiation. These detection devices, however, have significant disadvantages. See Ganeshan, U.S. Pat. No. 6,278,374. Flame rods experience thermal degradation and a relatively short life span because the tip of the rod must remain in constant contact with the burner flame or pilot flame. Photosensitive and photoelectric devices are limited in their construction to materials which can withstand high temperature, and the devices are adversely affected by dust and must be periodically purged with air. More importantly, none of the devices are capable of monitoring multiple burners and all of the devices are extremely limited in their analysis of the combustion process.

To allow for the monitoring of multiple burners with a single flame detection device, and to provide for improved qualitative and quantitative analysis of the combustion process, analog and digital cameras are increasingly being used. One or more cameras are positioned to acquire an image of one or more burner or pilot flames. The camera may be fitted with a charge-control device, have a UV or infrared lens or filter, and may include an optical probe. Characteristic parameters of the flame are then derived directly from the flame image using various algorithms and compared to one or more reference flame measurements.

Although cameras provide for improved qualitative and quantitative analysis of the flame, the cameras are not immune to the extreme heat and dust that adversely affects the performance of conventional detection devices. Therefore, a need exists for a sensor housing system that adequately protects a camera and other detection devices from extreme heat and dust.

BRIEF SUMMARY OF THE INVENTION

The present invention provides a sensor housing system that is capable of maintaining a sensor—which is used in monitoring an extreme temperature environment such that found within a combustion unit—at a desired ambient temperature. The sensor housing system includes one or more sensors contained within an internal chamber and cooled by a supply of air or inert gas. The gas enters the internal chamber at a temperature preferably in the range of 80° to 100° F. and flows annular about the sensor until it comes into contact with an inverted ring located at a distal end of the chamber. The inverted ring causes the gas to reverse flow, cool an end of the sensor closest to the extreme temperature environment, and exhaust to a second internal chamber arranged concentrically about the first chamber.

Upon entering the second chamber, the gas directly flows to a high temperature glass wafer. The glass wafer is contained within the second chamber by a high alloy snap ring. An external surface of the wafer is exposed to the extreme temperature environment of the combustion unit. As the gas makes contact with the internal surface of the wafer, the gas reverses flow, travelling a predetermined, calculated distance along an interior surface of the second chamber before exhausting to atmosphere at a temperature preferably less than 200° F. In a preferred embodiment, an interior surface of the second chamber is coated with a machined refractory material.

The external surface of the glass wafer, which is sealed from the interior of the second chamber, is in communication with an air tube having a sweep. The sweep is directed toward the external surface of the glass wafer and directs a hot gas stream across the surface. The hot gas stream, which is preferably at a temperature of about 200° F., provides an air curtain medium between the extreme temperature environment and the external surface of the glass wafer and sweeps away debris from the glass wafer.

Portions of the first and second chambers are contained in a directional ball pivot that provides the housing system access to the extreme temperature environment and allows for adjusting the angle and depth of the sensor relative to the interior of the environment. The housing system also contains a temperature thermocouple that is housed within the first internal chamber. The thermocouple is in communication with a variable control valve that regulates the flow of gas to the first internal chamber. The thermocouple is also in communication with a high temperature control trip circuit as a failsafe measure if for some reason the sensor becomes too hot.

A failsafe device is provided for retracting the chambers to atmosphere in case of a high temperature circuit trip or a power failure. The failsafe device is connected to a two-way air cylinder, which in turn is connected to an electric solenoid. The electric solenoid is energized for insertion and de-energized for extraction thereby providing protection to the sensor in case of a power failure or tripping of the high temperature control circuit.

A better understanding of the invention will be obtained from the following description of the preferred embodiments and the claims, taken in conjunction with the attached drawings.

BRIEF DESCRIPTION OF THE DRAWINGS

FIG. 3 is an exploded view of the sensor housing system illustrating an insulator and a glass housing assembly that contains the first and second cooling chambers.

FIG. 4 is an exploded view of the sensor housing system illustrating a sensor holding assembly, sensor housing assembly, and failsafe device. The failsafe device retracts the first and second chambers from the combustion unit in case of a power failure or a high temperature indication at the sensor.

DETAILED DESCRIPTION OF THE PREFERRED EMBODIMENTS

The invention that is now to be described is not limited in its application to the details illustrated in the accompanying drawings. The invention is capable of other embodiments and of being practiced or carried out in a variety of ways. The phraseology and terminology employed herein are for purposes of description and not limitation.

Figure 1:
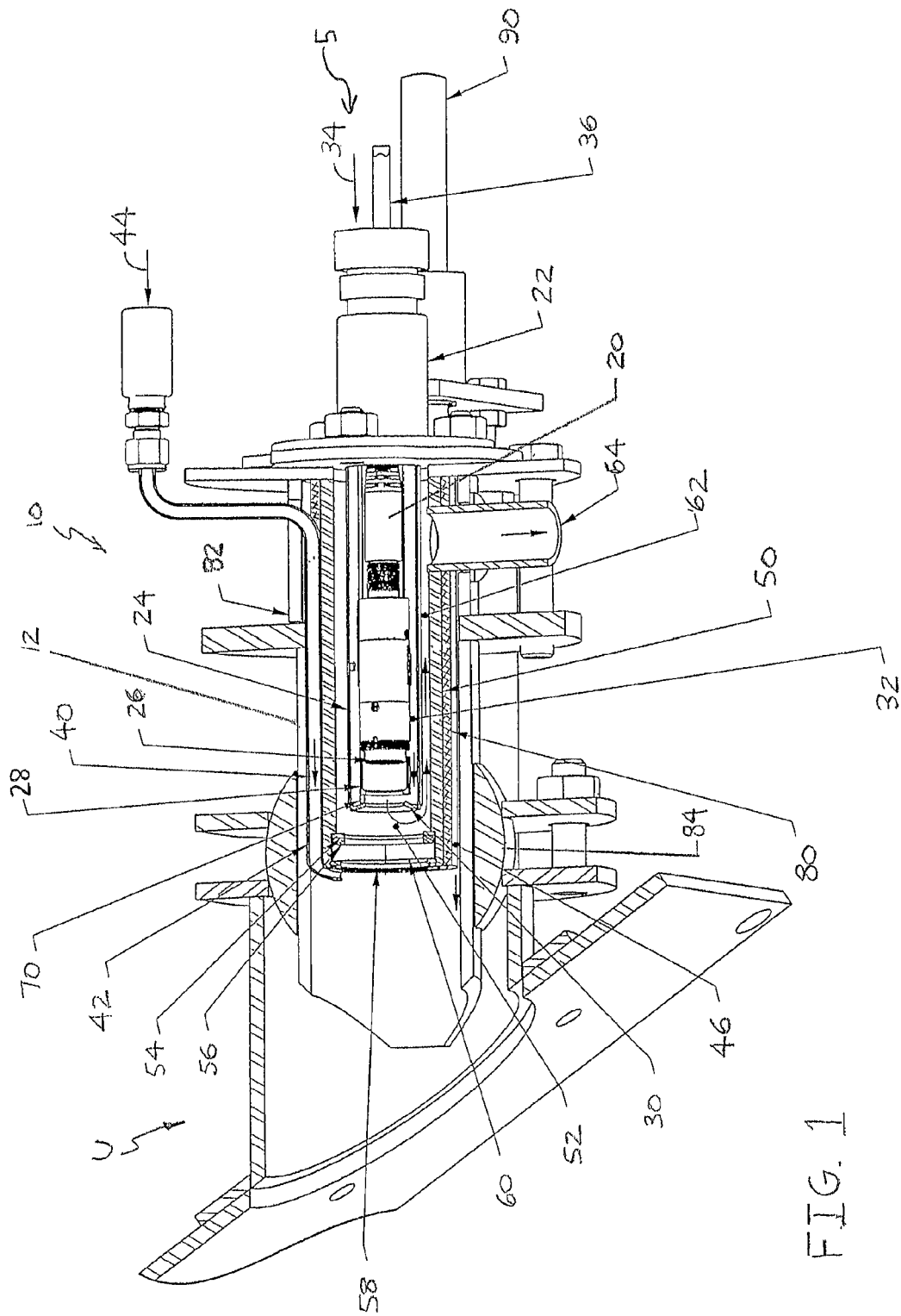
FIG. 1 is a cross-sectional view of a sensor housing system mounted within a ball pivot and configured to contain a sensor and protrude into an interior of a combustion unit. A low volume cooling medium supply (not shown) having a cool exit and a hot exhaust serves to cool the sensor and sweep away debris from a high temperature glass wafer located at a forward portion of the sensor.
Figure 2:
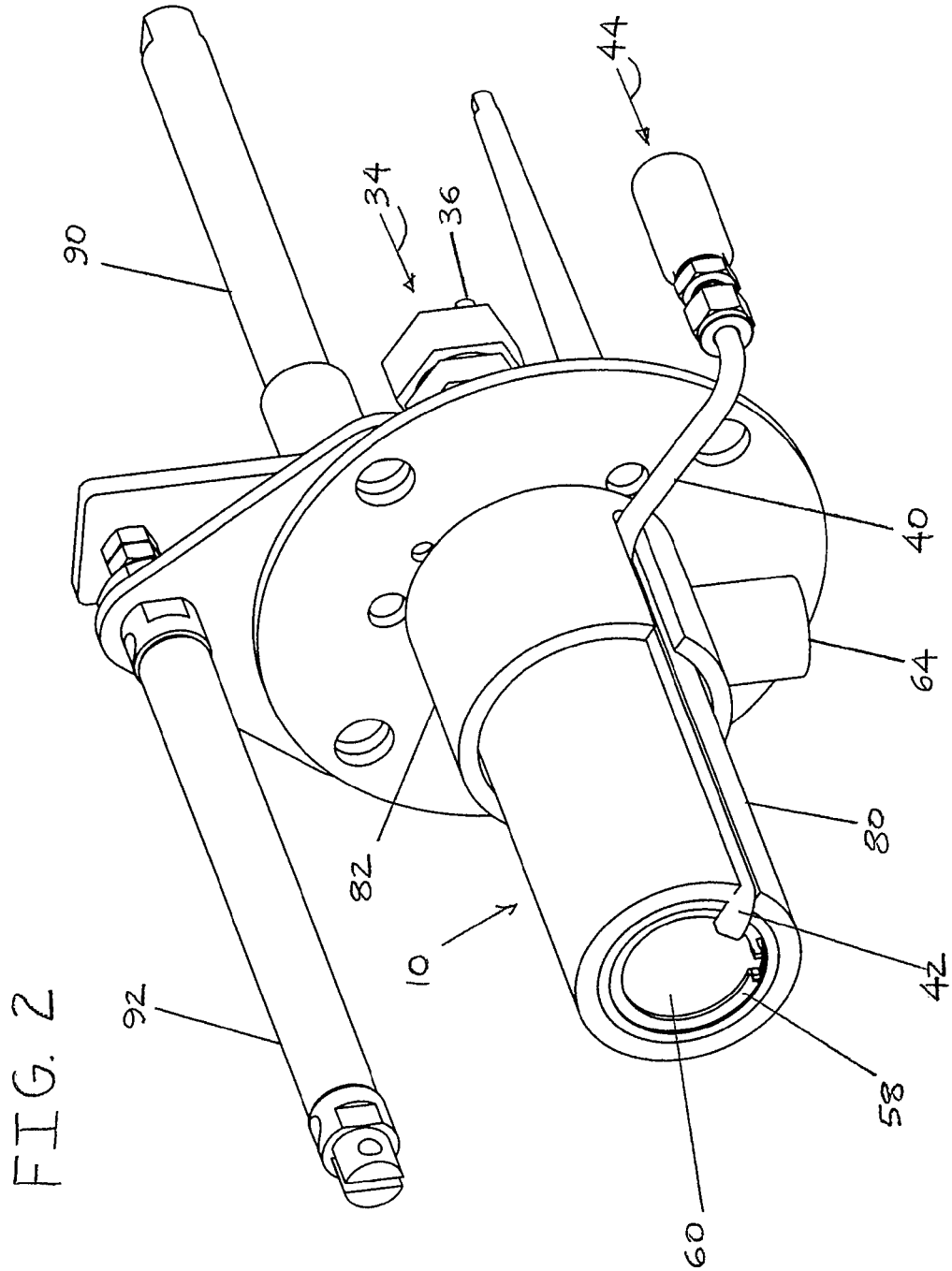
FIG. 2 is an isometric view of the sensor housing system.

Referring first to FIGS. 1 and 2, a sensor housing system 10 is mounted within a directional ball pivot 84 and connected to a low volume cooling medium supply S (not shown). Supply S is preferably air or an inert gas. A portion of sensor housing system 10 protrudes into a combustion unit U (or other extreme temperature environment) at a predetermined depth and at an angle established by ball pivot 84. Ball pivot 84 may be rotated and housing system 10 inserted at various depths by manual or remote movement. Sensor holder assembly 22 orients a sensor 20 within housing system 10. The orientation established by ball pivot 84 allows sensor 20 to monitor select internal regions of combustion unit U. Sensor 20 may be any of a number of different types of sensors including but not limited to cameras, probes, pressure devices, and optical devices. As described below, the configuration and design of housing system 10 provides and maintains a suitable ambient temperature for sensor 20.

Cooling medium supply S is configured to have a hot exhaust and a cool exit. The hot exhaust provides a hot gas stream 44 that is routed to an air tube 40 having a sweep 42 at its distal end. In a preferred embodiment, gas stream 44 is at a temperature of about 200° F. Sweep 42 produces a flat spray pattern exhaust and is oriented so as to direct this flat spray pattern across an exterior surface of a high temperature glass wafer 60. The flat spray pattern exhaust provides an air curtain medium between the extreme high temperatures within combustion unit U and the exterior surface of glass wafer 60. Additionally, the flat spray pattern exhaust provides a constant sweep away of debris arising within combustion unit U from the exterior surface of glass wafer 60.

The cool exit of supply S provides a cool gas stream 34 which is routed to an inlet end of sensor holder assembly 22. In a preferred embodiment, cool gas stream 34 is at a temperature in a range of about 80° to 100° F. By precisely routing cool gas stream 34 to sensor 20, sensor 20 may be cooled to an ambient suitable temperature in a range of about 20° to 120° F.

Housing system 10 further comprises a pair of interior chambers 32, 62 that provide for exact pressure and heat transfer capacities that enable sensor 20 to remain at a desired ambient temperature. Interior chamber 32 is formed by an interior surface of sensor housing assembly 24 and an exterior surface of sensor 20. In a preferred embodiment, sensor 20 is a camera having a sensor lens 26. Sensor housing assembly 24 also contains a thermocouple 70. Sensor 20 and thermocouple 70 are in communication with a controller (not shown) via a sensor cable and thermocouple wire 36. In a preferred embodiment, a temperature of sensor 20 is analyzed remotely by the controller and a signal is transferred to a variable control valve (not shown) to regulate a flow of cool gas stream 34 to sensor housing assembly 24.

Interior chamber 62 is formed by an exterior surface of sensor housing assembly 24 and an interior surface of glass holder assembly 50. Glass holder assembly 50 is contained within an insulator 80. A gas pipe 82 surrounds a portion of insulator 80 and contains a portion of the interior chambers 32, 62 and air tube 40. An exterior surface of insulator 80 and an interior surface of housing body 12 form an external chamber 46. External chamber 46 substantially encompasses the interior chambers 32, 62 and air tube 40. Interior chamber 62 serves to carry away heat exhausted by chamber 32 and cool the extreme heat zone 52 that lies between the interior surface of glass wafer 60 and sensor cap 28. In a preferred embodiment, an interior surface of chamber 62 is coated with a machined refractory material.

Cool gas stream 34 enters interior chamber 32 through sensor holder assembly 22 and passes annular about sensor 20. The initial directional contact mass flow of cool gas stream 34 with sensor 20 then flows to an inverted ring 30 located at a distal end of interior chamber 32. Inverted ring 30 deflects gas stream 34 and creates a reverse flow upon sensor cap 28, causing direct cooling upon an end of sensor 20 lying closest to the extreme heat of combustion unit U.

Upon direct contact with sensor cap 28, cool gas stream 34 makes another annular reverse turn and exhausts to interior chamber 62. Within interior chamber 62, gas stream 34 applies direct flow onto an interior surface of glass wafer 60. Glass wafer 60 is contained within glass holder assembly 50 and is held in position by a high alloy retainer ring 58. A gasket 56 and washer 54 seal the exterior surface of glass wafer 60 from interior chamber 62. After gas stream 34 contacts glass wafer 60, gas stream 34 reverses flow travels annular about interior chamber 62 and along an interior surface of interior chamber 62 for a fixed distance calculated for heat transfer. Gas stream 34 then proceeds to exhaust to atmosphere at less than 200° F. through exhaust air pipe 64.

Housing system 10 further comprises a retractable failsafe device 92. If sensor 20 gets too hot as indicated by temperature thermocouple 70—which is monitored continuously by a high temperature trip control circuit (not shown)—failsafe device 92 will retract housing system 10 along a path established by rail 90 so that no portion of housing system 10 protrudes into the interior of combustion unit U. Retraction is accomplished by connecting failsafe device 92 to a two-way air cylinder (not shown) which, in turn, is in communication with an electric solenoid (not shown). The electric solenoid is energized for insertion and de-energized for extraction thereby providing protection to sensor 20 in case of a power failure or tripping of the high temperature control circuit.

What is claimed is:

1. An apparatus for housing a sensor used in monitoring a combustion unit comprising:
   one or more sensors;
   a cooling medium selected from the group consisting of air and inert gases;
   a cooling medium supply device having a cool exit and a hot exhaust;
   a high temperature glass wafer;
   a sweep; and
   two or more chambers;
   said first chamber housing said sensor and being in communication with the cool exit of said cooling medium supply device;
   said second chamber housing said first chamber and being in communication with said first chamber;

said glass wafer having a first and second surface and being located at an end of said second chamber, the first surface being in communication with an interior of said second chamber, the second surface being sealed from the interior of said second chamber; and said sweep being in communication with the hot exhaust of said cooling medium supply device and oriented relative to said glass wafer;

whereby said a cool exit stream passes annular about said first and second chambers and said sweep directs a hot exhaust stream across the second surface of said glass wafer.

2. An apparatus according to claim 1 further comprising an interior surface of said second chamber being coated with a refractory material.

3. An apparatus according to claim 1 further comprising said first and second chambers being concentrically arranged.

4. An apparatus according to claim 1 further comprising a variable control valve, said control valve being in communication with said cooling medium supply device and serving to regulate a flow of said cooling medium to said first chamber.

5. An apparatus according to claim 1 further comprising said cooling medium flowing directly onto the first surface of said glass wafer.

6. An apparatus according to claim 1 further comprising said first chamber exhausting said cooling medium to said second chamber.

7. An apparatus according to claim 1 further comprising an exhaust air pipe, said second chamber being in communication with said exhaust air pipe.

8. An apparatus according to claim 7 wherein an exhaust gas from said second chamber is at a temperature less than 200° F.

9. An apparatus according to claim 1 further comprising an inverted ring, said inverted ring being located at one end of said first chamber and causing a reverse flow of said cooling medium within an interior portion of said first chamber.

10. An apparatus according to claim 1 further comprising a high temperature alloy snap ring, said snap ring being oriented to hold said glass wafer in a proper position.

11. An apparatus according to claim 1 wherein a temperature of said cooling medium at the cool exit of said cooling medium supply is in a range of about 80° to 100° F.

12. An apparatus according to claim 1 wherein a temperature of the hot exhaust of said cooling medium supply is at a temperature of about 200° F.

13. An apparatus according to claim 1 further comprising a directional ball pivot, a portion of at least one said chamber being mounted within said ball pivot.

14. An apparatus according to claim 1 further comprising a thermocouple device, said thermocouple device being housed within one of said chambers.

15. An apparatus according to claim 14 further comprising a variable control valve, said thermocouple device being in communication with said variable control valve, said control valve being in communication with said cooling medium supply device and serving to regulate a flow of said cooling medium to said first chamber.

16. An apparatus according to claim 1 further comprising a failsafe device.

17. An apparatus according to claim 16 further comprising said failsafe device being connectable to a control circuit.

18. An apparatus according to claim 16 further comprising said failsafe device being capable of retracting said first and second chambers to atmosphere.

19. An apparatus according to claim 18 further comprising a two-way air cylinder and an electric solenoid; said two-way air cylinder being in communication with said electric solenoid.

* * * * *